(12) United States Patent
Kempf et al.

(10) Patent No.: US 6,746,074 B1
(45) Date of Patent: Jun. 8, 2004

(54) PEDESTRIAN PROTECTING DEVICE FOR A VEHICLE

(75) Inventors: Peter C. Kempf, Dexter, MI (US); Barney Bauer, Shelby Township, MI (US); Kurt Schulz, Harper Woods, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/602,871

(22) Filed: Jun. 25, 2003

(51) Int. Cl.$^7$ ............................................. B60R 21/00
(52) U.S. Cl. ........................... 296/187.04; 296/187.06; 296/193.11; 180/69.2
(58) Field of Search ................ 296/187.04, 187.06, 296/193.11; 180/69.2; 280/728.1, 728.2; 293/107

(56) References Cited

U.S. PATENT DOCUMENTS

| | | | |
|---|---|---|---|
| 5,415,429 A | * | 5/1995 | Fisher ........................ 280/741 |
| 5,785,368 A | | 7/1998 | Hartmann et al. ........... 293/134 |
| 5,810,427 A | * | 9/1998 | Hartmann et al. ...... 296/187.03 |
| 5,934,743 A | * | 8/1999 | Nohr et al. ............. 296/187.06 |
| 6,212,456 B1 | | 4/2001 | Stride ........................... 701/45 |
| 6,329,910 B1 | | 12/2001 | Farrington ................... 340/436 |
| 6,386,623 B1 | * | 5/2002 | Ryan et al. ............ 296/187.04 |
| 6,467,563 B1 | | 10/2002 | Ryan et al. .................. 180/274 |
| 6,474,679 B2 | | 11/2002 | Miyasaka et al. ......... 280/730.1 |
| 6,516,278 B1 | | 2/2003 | Ishizaki et al. ................ 702/33 |
| 2002/0014761 A1 | | 2/2002 | Miyasaka et al. ......... 280/730.1 |
| 2002/0093180 A1 | | 7/2002 | Breed ........................ 280/730.1 |
| 2003/0030552 A1 | * | 2/2003 | Tonkin ....................... 340/435 |
| 2003/0042714 A1 | | 3/2003 | Sawa ........................ 280/730.1 |
| 2003/0062208 A1 | | 4/2003 | Hamada et al. ............. 180/274 |

* cited by examiner

Primary Examiner—Joseph D. Pape
(74) Attorney, Agent, or Firm—Lonnie Drayer

(57) ABSTRACT

A pedestrian protecting device for a vehicle has an airbag having a first wall comprising a flexible layer and a second wall comprising a vehicle body panel. An inflatable interior cavity is formed between the first wall and the second wall. An inflator has a conduit to conduct inflation gas between the first wall and the second wall.

15 Claims, 3 Drawing Sheets

PEDESTRIAN PROTECTING DEVICE FOR A VEHICLE

FIELD OF THE INVENTION

This invention relates to an external airbag for a vehicle.

BACKGROUND OF THE INVENTION

Airbags are commonly employed to protect vehicle occupants. Recently, however, manufacturers have shown an interest in protecting a pedestrian who might be struck by a vehicle. One such system protects the pedestrian through the deployment of an airbag external of the vehicle. In the event the vehicle hits the pedestrian, a door panel on an exterior surface of a vehicle and hood opens to release a large airbag, which forms a cushion against injury for the pedestrian. Such a system has several drawbacks.

First, a door panel for an external airbag introduces a visible panel indentation on the exterior surface of the vehicle. This indentation interrupts the smooth line, finish and appearance of the vehicle hood. Accordingly, the door panel may be aesthetically undesirable.

Second, for such a system, the airbag and inflator are located underneath the door panel. Given the size of the airbag as well as the size of the inflator needed to inflate the airbag, much space is required underneath the hood to accommodate the external airbag and inflator. Because the hood extends over the engine, there is very little space available to accommodate these components.

Third, after deployment of the airbag, the airbag is typically replaced. Due to the size of the external airbag, its replacement adds significant expense to the maintenance of the protective system. It is therefore desirable to reduce this expense.

Finally, the airbag that deploys through the hood is secured through the open door panel. Accordingly, the end of the airbag that deploys out of the door panel is free to move. In the event of an accident, it would be preferable to attach the airbag in a more secure fashion to ensure that a pedestrian hit by the vehicle will not miss the airbag.

There is a need for an external airbag system that avoids the foregoing limitations.

SUMMARY OF THE INVENTION

Like existing exterior airbag systems, the present invention comprises an airbag and an airbag inflator. However, in contrast to these systems, the inventive airbag module has a unique airbag formed to be part of the top of a vehicle body panel. One wall of the airbag may be a flexible layer while another wall may be the vehicle body panel. The airbag inflator provides inflation gas to a space between the vehicle body panel and the flexible layer through a conduit, such as a port extending through the panel. In the event of a collision with a pedestrian, the inflator fills the space between the flexible layer and the vehicle body panel with inflation gas, expanding the flexible layer to form a cushion.

When not deployed, the flexible layer is attached to the outside surface of the vehicle body panel by an adhesive or by a vacuum. Because the airbag deploys from the outside surface of the body panel, no door panel is required. Moreover, no space underneath the body panel is required to store the airbag because the inventive airbag is stored on top of the body panel. The flexible layer may be transparent so as to allow color of the vehicle body panel to be seen through the layer. Alternatively, the flexible layer may match the body color of the vehicle.

The airbag has a seal between the flexible layer and the vehicle body panel to retain inflation gas between the two surfaces. The seal may extend around the periphery of the vehicle body panel so that the airbag is secured across the entire body panel rather than at one location. The vehicle body panel may be a vehicle hood.

The invention may use a replaceable pressurized gas cartridge to deploy the airbag. The stored pressurized gas will not damage the airbag during deployment. In this way, the airbag may be reusable. The airbag system is maintainable by simply replacing the gas cartridge.

The inventive airbag module is made by extending a flexible layer over a vehicle body panel. The flexible layer is sealed to the body panel. A conduit is created between the flexible layer and the body panel to permit inflation gas to pass between the two surfaces. The conduit is connected to an airbag inflator.

BRIEF DESCRIPTION OF THE DRAWINGS

The various features and advantages of this invention will become apparent to those skilled in the art from the following detailed description of the currently preferred embodiment.

DETAILED DESCRIPTION OF THE INVENTION

Figure 1:
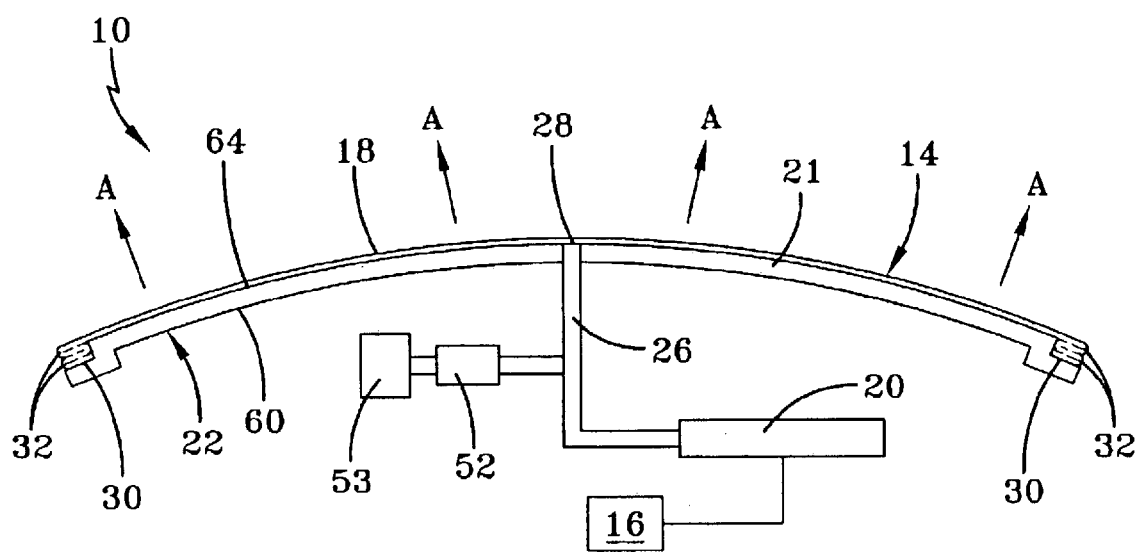
FIG. 1 is a side view of an inventive airbag module in an undeveloped state.

FIG. 1 is a side view of an inventive airbag module 10. Like existing airbag modules, the airbag module 10 comprises an airbag 14 and an airbag inflator 20. In contrast to existing airbag modules, however, the airbag 14 has two walls: a first wall 18 comprising a flexible layer, such as a plastic film, and a second wall 21 comprising a vehicle body panel 22, such as a vehicle hood. The first wall 18 and the second wall 22 define an inflatable cavity 48, an expandable space between the two walls. A conduit 26 conducts inflation gas from the inflator 20 through a port 28, which extends through a vehicle body panel 22, and ultimately to the inflatable cavity 48.

Figure 3:
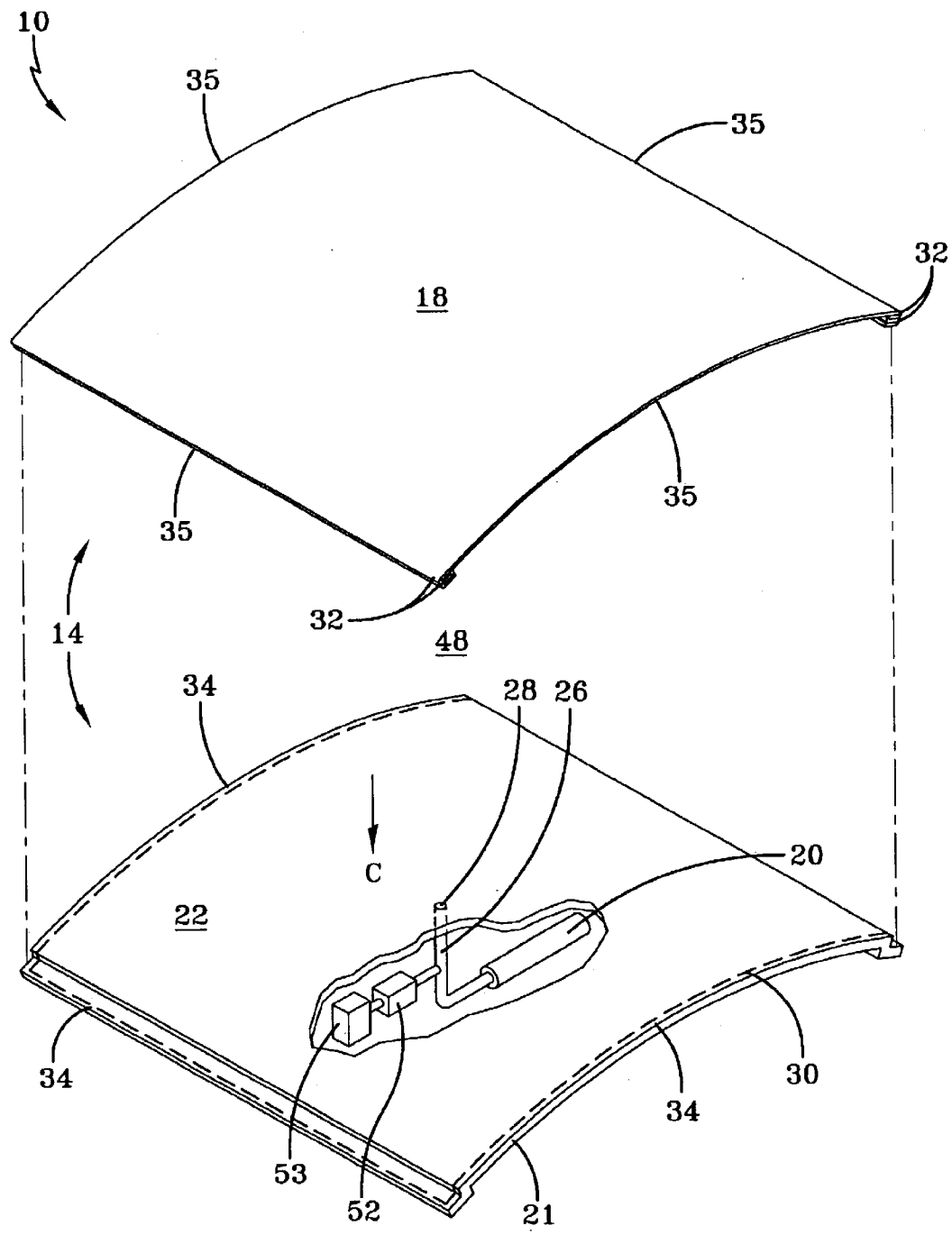
FIG. 3 illustrates a technique for manufacturing the airbag module of FIGS. 1 and 2.

A flexible layer 18 is attached to the vehicle body panel 22. As shown in FIG. 3, the airbag 14 has a seal 30 that bonds a periphery 35 of the flexible layer 18 to a periphery 34 of the vehicle body panel 22. The seal 30 about the periphery 34 of the vehicle body panel 22 and the periphery 35 of the flexible layer 18 defines an inflatable interior cavity 48.

Figure 2:
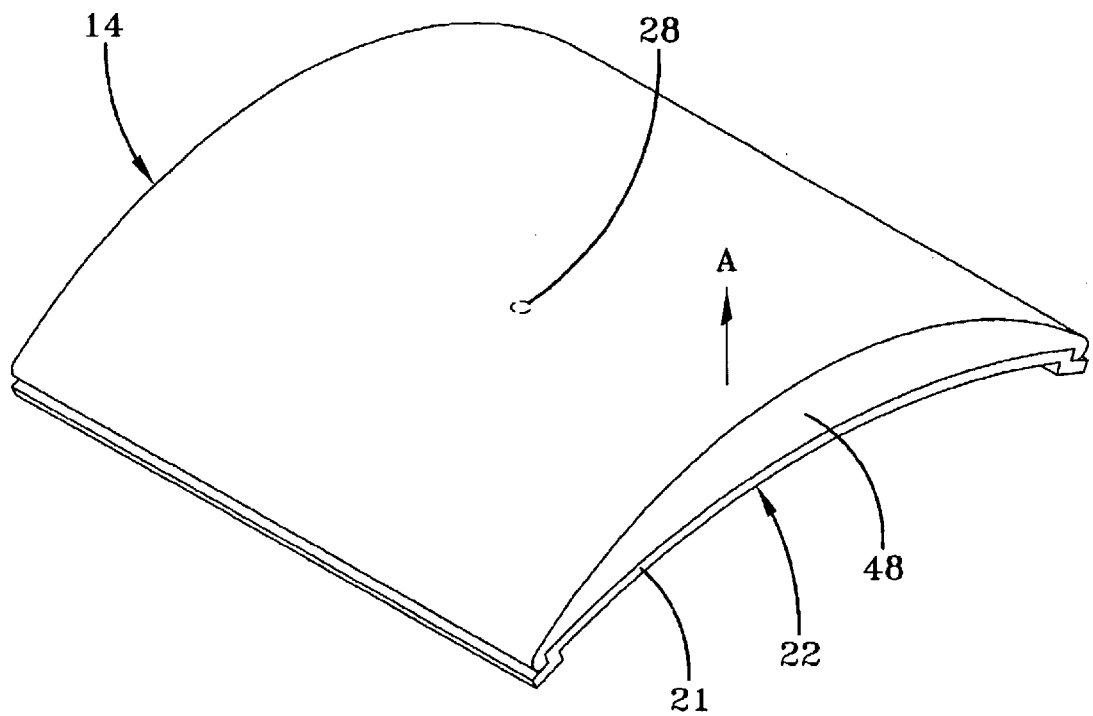
FIG. 2 is a perspective of the airbag module of FIG. 1 in a deployed state.

FIG. 1 shows the airbag module 10 in an undeployed and deflated state. In the event of a vehicle accident with a pedestrian, the inflator 20 receives a signal from an impact detection unit 16 to inflate the airbag 14. It is understood that any suitable device may be employed as an impact detection unit including, for example, a magnetostrictive sensor or a pressure sensor. Inflation gas fills the inflatable cavity 48 through a port 28, causing the flexible layer 18 to expand away from the vehicle body panel 22 along the direction of arrows A. In the fully deployed and inflated state, the airbag module 18 forms a cushion as shown in FIG. 2 on top of the vehicle body panel 22.

The vehicle body panel 22 has an inside surface 60 and an outside surface 64. The inside surface 60 faces interior components of a vehicle while the outside surface 64 forms an exterior surface of the vehicle. As shown, the airbag 14 deploys from the outside surface 64. It should be noted that no door panel is required to deploy the airbag 14. The airbag 14 also requires no space underneath the inside surface 64. Moreover, because the airbag 14 is extended across the outside surface 64 of the vehicle body panel 22 in a deflated state, the airbag 14 may deploy to an inflated state across the vehicle body panel 22 in very little time.

The airbag 14 has folds 32 that form part of the flexible layer 18. The folds 32 allow the airbag 14 to lie flat against the vehicle body panel 22 in the deflated state and to expand from the vehicle body panel 22 in the inflated state. When inflation gas fills the inflatable cavity 48, the folds 32 expand in an accordion-like fashion in a direction along arrows A.

To improve the cosmetic look of the airbag 14 on a vehicle body panel 22, the flexible layer 18 is held to the vehicle body panel either by a vacuum between the flexible layer 18 and the vehicle body panel 22 or by an adhesive in this space. That is, inwardly of the seal 30, the plane of the layer 18 is held against the panel 22. As shown in FIG. 1, gas may be removed from the inflatable interior cavity 48 by a pump 53 and through a port 28 and conduit 26 out of the valve 52 to create a vacuum. When the inflator 20 is actuated, a valve 52 would be closed. If an adhesive is used to keep the flexible layer 18 adhered to the vehicle body panel 22, then the valve 52 is unnecessary. The adhesive used should form a loose enough bond so that when inflation gas from the inflator 20 enters the inflatable cavity 48, the flexible layer 18 may expand easily away from the vehicle body panel 22. To further improve the appearance of the airbag module 10 on the vehicle, the flexible layer 18 may have a color to match a vehicle body or be transparent to permit the color of vehicle body panel 22 to be seen.

FIG. 3 illustrates a method of manufacturing an airbag module 10. As shown, a flexible layer 18 is positioned over a vehicle body panel 22. An inflator 20 is connected to a conduit 26. The vehicle body panel 22 is provided with a strong adhesive sealing agent along a periphery 34 of the vehicle body panel 22 to form a seal 30. That is, the adhesive used for the seal 30 should not come away from the panel during inflation, like the weak adhesive material described above. The seal 30, a first wall 18 and a second wall 21 define an inflatable cavity 48.

The gas between the flexible layer 18 and the vehicle body panel 22 may be removed to form a vacuum, creating a tight fit between the flexible layer 18 and the vehicle body panel 22. Gas is pumped out of the interior cavity 48 along the direction of arrow C through a port 28 and a valve 52. The pump 53 may be removed once the valve 52 is closed. That is, the manufacturer may create the vacuum, close the valve 52 and then the panel may be mounted on a vehicle. The vacuum forces the flexible layer 18 to lay flat against the vehicle body panel 22. The vacuum is sealed by closing the valve 52.

Figure 4:
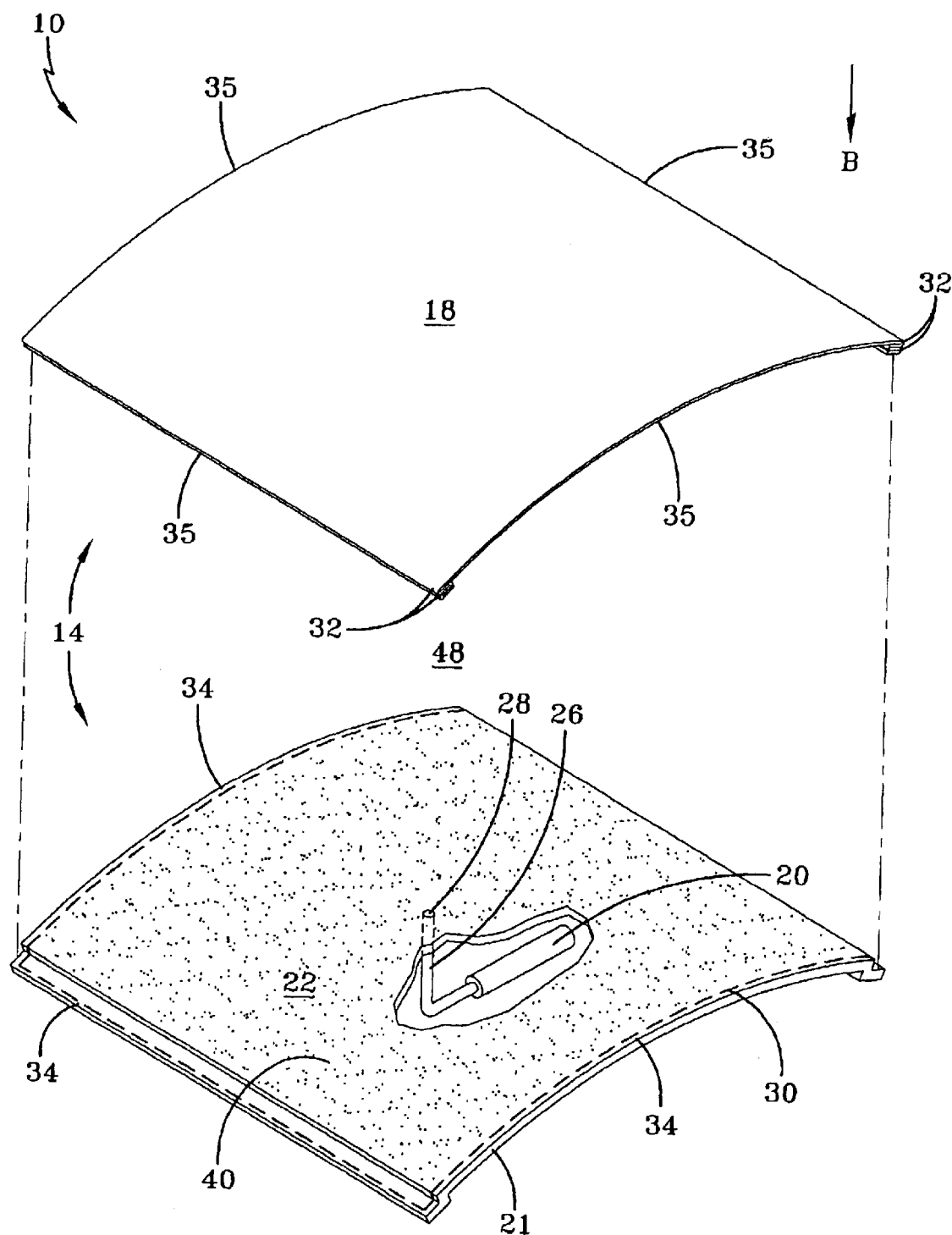
FIG. 4 illustrates a modified technique for manufacturing the airbag module.

As an alternative to a vacuum, as shown in FIG. 4, an adhesive 40 may be placed on the vehicle body panel 22 to ensure a close attachment of the flexible layer 18 to the vehicle body panel 22. The adhesive sealing agent along the periphery 34 of the vehicle body panel 22 should be strong enough to resist forces encountered during the inflation of the airbag 14. The adhesive 40, however, should form a weak bond. The flexible layer 18 is then placed along the direction of arrow B on vehicle body panel 22.

The aforementioned description is exemplary rather that limiting. Many modifications and variations of the present invention are possible in light of the above teachings. The preferred embodiments of this invention have been disclosed. One of ordinary skill in the art would recognize that certain modifications would come within the scope of this invention. Hence, within the scope of the appended claims, the invention may be practiced otherwise than as specifically described and the following claims should be studied to determine the true scope and content of this invention.

What is claimed is:

1. A pedestrian protecting device for a vehicle comprising:
   a vehicle body panel;
   a flexible layer attached to said vehicle body panel, said flexible layer being transparent; and
   an inflator having a conduit to conduct an inflation gas between said vehicle body panel and said flexible layer, the flexible layer has an inflated condition and a deflated condition, said flexible layer and said vehicle body panel forming a cushion in said inflated condition, the flexible layer forms a first wall of said cushion and said vehicle body panel forms a second wall of said cushion.

2. The pedestrian protecting device for a vehicle of claim 1 wherein said conduit comprises a port through said vehicle body panel.

3. The pedestrian protecting device for a vehicle of claim 1 including an adhesive between said flexible layer and said vehicle body panel.

4. The pedestrian protecting device for a vehicle of claim 1 including a vacuum between said flexible layer and said vehicle body panel.

5. The pedestrian protecting device for a vehicle of claim 1 wherein said inflator stores a pressurized inflation gas.

6. The pedestrian protecting device for a vehicle of claim 1 including a seal between said flexible layer and said vehicle body panel.

7. The pedestrian protecting device for a vehicle of claim 6 wherein said seal extends around a periphery of said vehicle body panel.

8. The pedestrian protecting device for a vehicle of claim 1 wherein said vehicle body panel comprises a vehicle hood.

9. An airbag for protecting a pedestrian impacting a vehicle comprising.
   a first wall comprising a flexible layer, said flexible layer being transparent;
   a second wall comprising a vehicle body panel; and
   an inflatable cavity formed between said first wall and said second wall.

10. The airbag for protecting a pedestrian impacting a vehicle of claim 9 including a port through said vehicle body panel in communication with said inflatable cavity.

11. The airbag for protecting a pedestrian impacting a vehicle of claim 9 wherein said flexible layer is attached to said vehicle body panel by an adhesive.

12. The airbag for protecting a pedestrian impacting a vehicle of claim 9 wherein said flexible layer is attached to said vehicle body panel by a vacuum.

13. The airbag for protecting a pedestrian impacting a vehicle of claim 9 including a seal between said flexible layer and said vehicle body panel.

14. A pedestrian protecting device for a vehicle comprising:
 a vehicle body panel;
 a flexible layer attached to said vehicle body panel, the flexible layer being attached to the body panel by a vacuum; and
 an inflator having a conduit to conduct an inflation gas between said vehicle body panel and said flexible layer, the flexible layer has an inflated condition and a deflated condition, said flexible layer and said vehicle body panel forming a cushion in said inflated condition, the flexible layer forms a first wall of said cushion and said vehicle body panel forms a second wall of said cushion.

15. An airbag for protecting a pedestrian impacting a vehicle comprising:
 a first wall comprising a flexible layer;
 a second wall comprising a vehicle body panel the first wall be attached to the second wall by a vacuum; and
 an inflatable cavity formed between said first wall and said second wall.

* * * * *